United States Patent Office 2,987,515
Patented June 6, 1961

2,987,515
URETHANES

Verner L. Stromberg, Shrewsbury, and William B. Hughes, Webster Groves, Mo., assignors to Petrolite Corporation, Wilmington, Del., a corporation of Delaware
No Drawing. Filed Feb. 3, 1958, Ser. No. 712,662
17 Claims. (Cl. 260—256.4)

This invention relates to urethanes of hydroxy-aliphatic cyclic amidines and more particularly to the diurethanes of imidazolines and tetrahydropyrimides. This invention also relates to a process of preparing these compounds which comprises reacting a hydroxyaliphatic cyclic amidine, for example, a hydroxyaliphatic imadazoline or tetrahydropyrimidine with an organic isocyanate, but preferably an organic diisocyanate. This invention also relates to a process of using these urethanes as corrosive inhibitors in preventing the corrosion of metals, most particularly iron, steel and ferrous alloys.

Heretofore, a wide variety of cyclic amidine compounds have been employed to inhibit the corrosion of oil well equipment. Although we had expected that hydroxyaliphatic cyclic amidines would also be very effective in inhibiting oil field corrosion, we found that these compounds had very poor corrosion inhibiting properties.

However, we have now unexpectedly discovered that the derivatives of these hydroxyaliphatic cyclic amidines, particularly the diurethane derivatives thereof, are very effective corrosion inhibitors, in many cases from 10–15 or more times as effective as the corresponding hydroxyaliphatic cyclic amidine.

The corrosion inhibitors disclosed herein are particularly useful in preventing the corrosion of oil equipment, for example, in producing wells, pipe lines, refineries, tank storage, etc., which are in contact with corrosive oil-containing medium, for example, in oil wells producing corrosive oil or oil-brine mixtures in refineries, and the like. These compositions possess properties which impart to metals resistance to attack by a wide variety of corrosive agents, among which may be mentioned brines, organic and inorganic acids, $CO_2$, $H_2O$, $O_2$, etc. and combinations thereof.

More specifically, the above-described cyclic amidine compounds may be described by the formulae:

(1) 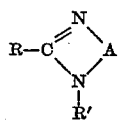

(2) 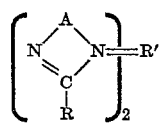

(3) 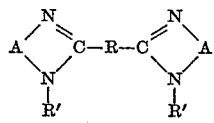

(4) 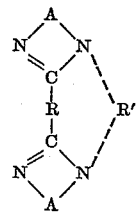

(The dotted lines indicate the undetermined structure, probably polymeric) in which

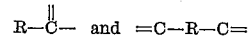

are the residual radicals derived from the carboxylic acids

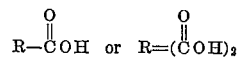

where R comprises, for example, a saturated or unsaturated aliphatic radical, a cycloaliphatic radical, an aryl radical, an aralkyl radical, an alkaryl radical, an alkoxyalkyl radical, an aryloxyalkyl radical, and the like, and A is an alkylene group, for example, ethylene and propylene radicals, or substituted derivatives thereof, such as

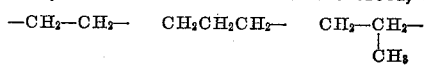

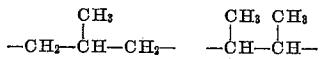

and R' is the urethane product of the reaction of a hydroxy-containing alkylene, polyoxyalkylene, etc., groups with an isocyanate.

More specifically, the corrosion inhibiting aspect of this invention relates to a method for inhibiting corrosion of ferrous metals by hydrocarbon fluids containing water and corrosive materials such as $H_2S$, $CO_2$, inorganic acids, organic acids, etc., combinations of these materials with each other, combinations of each of said corrosive materials with oxygen, and combinations of said materials with each other and oxygen, which comprises treating ferrous metals such as by adding to said fluids at least 5 parts per million of the above urethane compounds, said compounds being sufficiently soluble in the hydrocarbon fluid to inhibit corrosion.

THE HYDROXY ALIPHATIC CYCLIC AMIDINE

The expression "cyclic amidines" is employed in its usual sense to indicate ring compounds in which there are present either 5 or 6 members, and having 2 nitrogen atoms separated by a single carbon atom supplemented by either two additional carbon atoms or three additional carbon atoms completing the ring. All the carbon atoms may be substituted. In the present instance the nitrogen atom of the ring involving two monovalent linkages (the 1-position) is substituted with an hydroxy aliphatic group, i.e., $-(RO)_nH$ groups where R is alkylene and n is a whole number, for example, 1–5 or higher.

These cyclic amidines are further characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids, polycarboxy acids, and the like.

For details of the preparation of imidazolines substituted in the 2-position from amines, see the following U.S. Patents, U.S. No. 1,999,989 dated April 30, 1935, Max Bockmuhl et al.; U.S. No. 2,155,877 dated April 25, 1939, Edmund Waldmann et al., and U.S. No. 2,155,878 dated April 25, 1939, Edmund Waldmann et al. Also see Chem. Rev. 32, 47 (43), and Chem. Rev. 54,593 (54).

Equally suitable for use in preparing compounds useful in our invention and for the preparation of tetrahydropyrimidines substituted in the 2-position are the corresponding polyamines containing at least one primary amino group and one secondary amino group, or another primary amino group separated from the first primary amino group by three carbon atoms instead of being separated by only 2 carbons as with imidazolines. This reaction as in the case of the imidazoline is generally carried out by heating the reactants to a temperature at which 2 moles of water are evolved and ring closure is effected. For details of the preparation of tetrahydropyrimidines, see German Patent No. 700,371 dated December 18, 1940 to Edmund Waldmann and August Chwala; German Patent No. 701,322 dated January 14, 1941, to Karl Kiescher, Ernst Urech and Willi Klarer and U.S. Patent No. 2,194,419 dated March 19, 1940 to August Chwala.

Substituted imidazolines and tetrahydropyrimidine are obtained from a variety of acids beginning with the one-carbon acid (formic) through and including higher fatty acids or the equivalent having as many as 30 carbon atoms, for example from 8–22 carbons. Modified fatty acids also can be employed as, for example, phenyl stearic acid or the like. Cyclic acids may be employed, including naphthenic acids. A variety of other acids including benzoic acid, substituted benzoic acid, salicyclic acid, and the like, have been employed to furnish the residue

from the acid RCOOH in which the C of the residue

is part of the ring. The fatty acids employed, for example, may be saturated or unsaturated. They may be hydroxylated or nonhydroxylated. Branched long chain fatty acids may be employed. See J. Am. Chem. Soc. 74,2523 (1952). This applies also to the lower molecular weight acids as well.

Among sources of such acids may be mentioned straight chain and branched chain, saturated and unsaturated, aliphatic, cycloaliphatic, aromatic, hydro-aromatic, aralkyl acids, etc.

Examples of saturated aliphatic monocarboxylic acids comprise: acetic, proprionic, butyric, valeric, caproic, heptanoic, caprylic, nonanoic, capric, undecanoic, lauric, tridecanoic, myriatic, pentadecanoic, palmitic, heptadecanoic, stearic, nonadecanoic, eicosanoic, heneicosanoic, docosanoic, triconsanoic, tetracosanoic, pentacosanoic, cerotic, heptacosanoic, montanic, nonacosanoic, melisaic and the like.

Examples of ethylenic unsaturated aliphatic acids comprise: acrylic, methacrylic, crotonic, anglic, teglic, the pentenoic acids, the hexenoic acids, for example, hydro sorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradeconoic acids, for example, myristoleic acid, the pentadecenoic acids, the hexadecenoic acids, for example, palmitoleic acid, the heptadecenoic acids, the octadecenoic acids, for example, petrosilenic acid, oleic acid, olaidic acid, the nonadecenoic acids, for example, the eicosenoic acids, the docosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Carboxylic acids containing functional groups such as hydroxy groups can be employed. Hydroxy acids, particularly the alpha hydroxy acids comprise glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelaidic acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids comprise ricinoleyl lactic acid, acetyl ricinoleic acid, chloroacetyl ricinoleic acid, and the like.

Examples of the cyclic aliphatic carboxylic acids comprise those found in petroleum called naphthenic acids, hydnocarbic and chaumoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneoic acids, alkoxy benzoic acid, phenyl benzoic acid, naphthalene carboxylic acid, and the like.

Mixed higher fatty acids derived from animal or vegetable sources, for example, lard, cocoanut oil, rapeseed oil, sesame oil, palm kernel oil, palm oil, olive oil, corn oil, cottonseed oil, sardine oil, tallow, soya-bean oil, peanut oil, castor oil, seals oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid; aralkyl and aromatic acids, such as Twitchell fatty acids, naphthoic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorstearic acid, etc.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesoconic, citraconic, glutonic, itaconic, muconic, acenitic acids, and the like.

Examples of aromatic polycarboxylic acids comprise phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise homimellitic, trimellitic, trimesic, mellophanic, prehnitic, pyromellitic acids, mellitic, acid, and the like.

Other polycarboxylic acids comprise the dimeric, trimeric and poly acids, for example, Emery Industries polymeric acids (such as those described in U.S. Patent 2,763,612), and the like. Other polycarboxylic acids comprise those containing ether groups, for example, diglycolic acid. Mixtures of the above acids can be advantageously employed.

In addition, acid precursors such as esters, acid chlorides, glycerides, etc. can be employed in place of the free acid.

Where the acid contains functional groups such as hydroxy groups, this should be taken into consideration in subsequent reaction with the isocyanate in calculating the stoichiometry of the reaction.

Hydroxy substituted imidazolines and tetrahydropyrimidines can be obtained in the manner described above from a wide variety of polyamines containing hydroxy groups. Thus, where one starts with a polyamine, for example, a diamine of the following formula

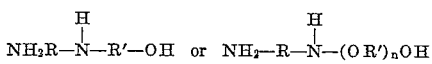

where R has 2 or 3 carbon chains in the main chain, one obtains the hydroxyalkylene compounds useful in this invention. In addition, one can start with ethylene diamine or with 1,2-propylene diamine, 1,3-propylenediamine or other polyamines and then react the cyclic amidine so obtained with alkylene oxides so as to produce a terminal hydroxy group since the nitrogen bonded hydrogen on the 1-position on the ring reacts with alkylene oxides. In addition the hydroxyalkylene group can be oxyalkylated.

Alkylene oxides comprise those of the general formula,

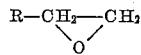

where R is hydrogen or an alkyl group. Among the alkylene oxides that may be employed are ethylene, propylene, butylene, octylene, etc. oxides, etc. Other oxyalkylation agents such as glycide, epichlorohydrin, etc. can also be employed.

Thus hydroxy compounds within the scope of this invention which react with isocyanates comprise compounds of the formulae:

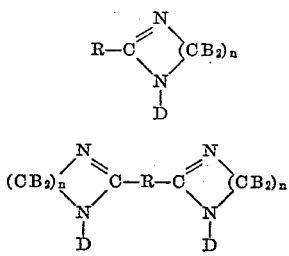

where

is the residue derived from the carboxylic acid, where R is a hydrocarbon radical having, for example, up to about 30 carbon atoms, hydrocarbons in which the carbon atom chain is interrupted by oxygen, etc., $n$ is 2 or 3; and B is a hydrogen or a hydrocarbon radical, for example, an alkyl radical; and D is a hydroxy aliphatic radical, for example —ROH or —(RO)$_x$OH, wherein $x$ is a whole number, for example, 1–10, but preferably 1–5, and $CB_2$ is, for example, a divalent radical of the formula:

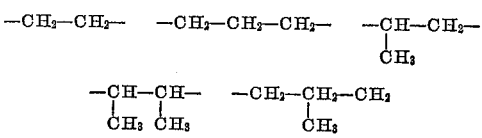

etc.

In general, the hydroxyalkyl cyclic amidines are prepared by reacting a polyamine containing a terminal alkanol group with a carboxylic acid at temperatures of from 150–175° C. employing an azeotroping agent such as xylene to remove water. A reaction time of 3–4 hours is employed. Completion of reaction is judged by the separation of 2 moles of $H_2O$ for each carboxylic acid group. The products are in general dark viscous oils.

Since the preparation of cyclic amidines is so well known (see above cited patents) it is not believed that any examples are necessary to illustrate such a well known procedure. However, for purposes of illustration the following are included.

*Example 10a*

A solution of 1 mole of hydroxyethyl ethylene diamine,

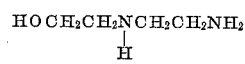

and 1 mole of oleic acid in 300 grams of xylene are charged to a flask and brought to reflux, the mixture being heated under a Dean-Stark water trap, condenser in order to distill off the water-xylene azeotrope mixture, to separate the water and to continuously return xylene to the reaction mixture. Reflux is continued at a temperature of 160–170° C. for about 3½ hours until about 2 moles of water is removed. The product is

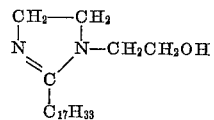

*Example 9b*

The above example is repeated except that hydroxyethyl propylene diamine 1-3,

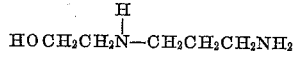

is employed in place of hydroxyethylethylene diamine and stearic acid is employed in place of oleic acid. The product produced is

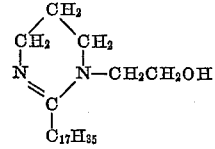

*Example 4c*

Example 10a is repeated with the same amine

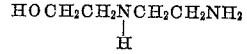

(2 moles), except that a polycarboxylic acid, sebacic acid (1 mole) is employed. Instead of two moles of water being removed, as in the prior example, about 4 moles of water are removed. The product is

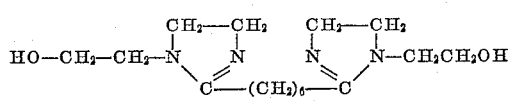

*Example 20d*

Example 4c is repeated except that a different amine,

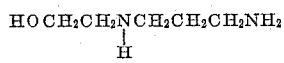

(2 moles) and a different polycarboxylic acid, terephthalic acid (1 mole), are employed. As in the prior example, 4 moles of water are removed. The product is

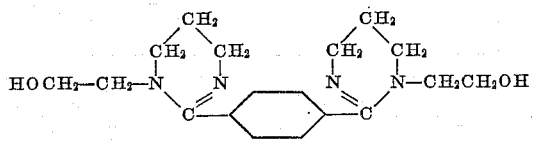

In general, to form the polyoxyalkylatedhydroxy cyclic amidines, the hydroxyalkylcyclic amidine is first prepared in the manner shown above and then reacted with alkylene oxides by the conventional manner of oxyalkylation to the desired degree of oxyalkylation using a jacketed stainless steel autoclave in the manner described in U.S. Patent 2,792,369. The following examples are illustrative:

*Example 11a*

One mole of

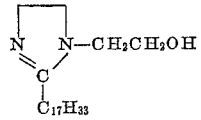

(50% solution in xylene) is reacted with 1 mole of ethylene oxide at a temperature of 125–130° C. and a pressure of 10–15 p.s.i. The time regulator is set to add ethylene oxide over ½ hour followed by additional stirring for another ½ hour to insure complete reaction. Ethylene oxide is readily taken up by the reactants. The product is

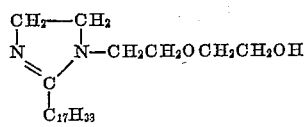

*Example 12a*

The above example is repeated using a propylene oxide and

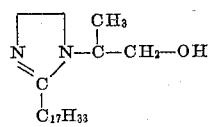

under similar conditions. The product is

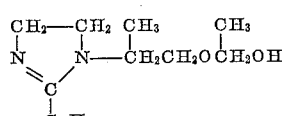

*Example 28a*

Example 11a is repeated except that 2 moles of ethylene oxide are employed. The product is

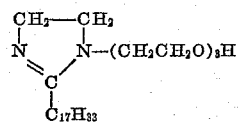

Since the above examples are typical methods of preparation, it would be repetitious to repeat the details of each preparation. Therefore, the reactants employed by us in preparing other hydroxycyclic amidines of these types are listed in the following tables:

TABLE I

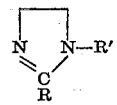

| Ex. No. | RCOOH Source of RC | R' |
|---|---|---|
| 1a | Lauric | CH₂CH₂OH |
| 2a | Hexanoic | CH₂CH₂OH |
| 3a | Isovaleric | CH₂CH₂OH |
| 4a | Stearic | CH₂CH₂OH |
| 5a | Melissic | CH₂CH₂OH |
| 6a | Phenyl Stearic | CH₂CH₂OH |
| 7a | Benzoic | CH₂CH₂OH |
| 8a | Cresotinic | CH₂CH₂OH |
| 9a | Naphthenic | CH₂CH₂OH |
| 10a | Oleic | CH₂CH₂OH |
| 11a | Oleic | CH₂CH₂OCH₂CH₂OH |
| 12a | Oleic | $\overset{CH_3}{C}H_2CH_2O\overset{CH_3}{C}H_2CH_2OH$ |
| 13a | Lauric | CH₂CH₂OCH₂CH₂OH |
| 14a | Palmitic | CH₂CH₂OCH₂CH₂OH |
| 15a | Cerotic | CH₂CH₂OCH₂CH₂OH |
| 16a | p-tert-Butyl benzoic | CH₂CH₂OCH₂CH₂OH |
| 17a | Benzoic | CH₂CH₂OCH₂CH₂OH |
| 18a | Toluic | CH₂CH₂OCH₂CH₂OH |
| 19a | Naphthenic | CH₂CH₂OCH₂CH₂OH |
| 20a | Benzoic | CH₂CH₂OCH₂CH₂OH |
| 21a | Formic | CH₂CH₂OCH₂CH₂OCH₂CH₂OH |
| 22a | Methyloctadecanoic | CH₂CH₂OC₂H₄CH₂OCH₂CH₂OH |
| 23a | Capric | CH₂CH₂OC₂H₄CH₂OCH₂CH₂OH |
| 24a | Stearic | CH₂CH₂OC₂H₄CH₂OCH₂CH₂OH |
| 25a | Phenylstearic | CH₂CH₂OC₂H₄CH₂OCH₂CH₂OH |
| 26a | Cresotinic | CH₂CH₂OC₂H₄CH₂OCH₂CH₂OH |
| 27a | Linoleic | CH₂CH₂OC₂H₄CH₂OCH₂CH₂OH |
| 28a | Oleic | CH₂CH₂OC₂H₄CH₂OCH₂CH₂OH |
| 29a | 3-methoxybenzoic | CH₂CH₂OC₂H₄CH₂OCH₂CH₂OH |
| 30a | Naphthenic | CH₂CH₂OC₂H₄CH₂OCH₂CH₂OH |

TABLE II

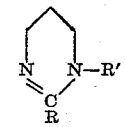

| Ex. No. | RCOOH Source of RC | R' |
|---|---|---|
| 1b | Formic | CH₂CH₂OH |
| 2b | Acetic | CH₂CH₂OH |
| 3b | Butyric | CH₂CH₂OH |
| 4b | Valeric | CH₂CH₂OH |
| 5b | Isovaleric | (CH₃)CH₂CH₂OH |
| 6b | Trimethyl Acetic | CH₂CH₂OH |
| 7b | Pelargonic | CH₂CH₂OH |
| 8b | Lauric | CH₂CH₂OCH₂CH₂OH |
| 9b | Stearic | CH₂CH₂OH |
| 10b | Arachidic | CH₂CH₂OH |
| 11b | Eicosane-carboxylic | (CH₃)CH₂CH₂OH |
| 12b | Cerotic | CH₂CH₂OH |
| 13b | Melissic | CH₂CH₂OH |
| 14b | Phenyl Stearic | CH₂CH₂OCH₂CH₂OH |
| 15b | Benzoic | CH₂CH₂OH |
| 16b | b-methy benzoic acid | CH₂CH₂OH |
| 17b | Cresotinic | CH₂CH₂OH |
| 18b | p-methybenzoic | CH₂CH₂OH |
| 19b | P-tert-Butyl-benzoic | CH₂CH₂OH |
| 20b | 3-methoxy benzoic | CH₂CH₂OH |
| 21b | Oleic | CH₂CH₂OH |
| 22b | Undecylenic | CH₂CH₂OH |
| 23b | Linoleic | CH₂CH₂OH |
| 24b | Butyric | CH₂CH₂OH |
| 25b | Methyloctadecanoic | CH₂CH₂OH |

TABLE III

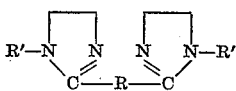

| Ex. No. | HOOC—R—COOH Source of —CRC— | R' |
|---|---|---|
| 1c | Malonic | CH₂CH₂OH |
| 2c | Adipic | CH₂CH₂OH |
| 3c | Suberic | CH₂CH₂OH |
| 4c | Sebacic | CH₂CH₂OH |
| 5c | Nonodecane dicarboxylic | CH₂CH₂OH |
| 6c | Diglycolic | CH₂CH₂OH |
| 7c | Ethylene Bis(glycolic) | CH₂CH₂OH |
| 8c | Methylene dibenzoic | CH₂CH₂OH |
| 9c | Stearyl Malonic | CH₂CH₂OH |
| 10c | Phthalic | CH₂CH₂OH |
| 11c | Succinic | CH₂CH₂O CH₂CH₂OH |
| 12c | Glutaric | CH₂CH₂O CH₂CH₂OH |
| 13c | Pimelic | CH₂CH₂O CH₂CH₂OH |
| 14c | Azelaic | CH₂CH₂O CH₂CH₂OH |
| 15c | Eicosane dicarboxylic | CH₂CH₂O CH₂CH₂OH |
| 16c | Dilinoleic | CH₂CH₂O CH₂CH₂OH |
| 17c | Isophthalic | CH₂CH₂O CH₂CH₂OH |
| 18c | Diglycolic | CH₂CH₂O CH₂CH₂OH |
| 19c | Lauryl Malonic | CH₂CH₂O CH₂CH₂OH |
| 20c | Methylene dibenzoic | CH₂CH₂O CH₂CH₂OH |
| 21c | Malonic | CH₂CH₂O C₂H₂CH₂O CH₂CH₂OH |
| 22c | Succinic | CH₂CH₂O C₂H₂CH₂O CH₂CH₂OH |
| 23c | Suberic | CH₂CH₂O C₂H₂CH₂O CH₂CH₂OH |
| 24c | Pimelic | CH₂CH₂O C₂H₂CH₂O CH₂CH₂OH |
| 25c | Nonedecane dicarboxylic | CH₂CH₂O C₂H₂CH₂O CH₂CH₂OH |
| 26c | Diglycolic | CH₂CH₂O C₂H₂CH₂O CH₂CH₂OH |
| 27c | Methylene dibenzoic | CH₂CH₂O C₂H₂CH₂O CH₂CH₂OH |
| 28c | Stearyl malonic | CH₂CH₂O C₂H₂CH₂O CH₂CH₂OH |
| 29c | Stearyl succinic | CH₂CH₂O C₂H₂CH₂O CH₂CH₂OH |
| 30c | Terephthalic | CH₂CH₂O C₂H₂CH₂O CH₂CH₂OH |

TABLE IV

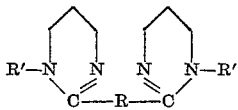

| Ex. No. | HOOC—R—COOH Source of —CRC— | R' |
|---|---|---|
| 1d | Malonic | CH₂CH₂OH |
| 2d | Succinic | CH₂CH₂OH |
| 3d | Glutaric | CH₂CH₂OH |
| 4d | Adipic | CH₂CH₂OH |
| 5d | Suberic | (CH₃)CH₂CH₂OH |
| 6d | Sebacic | CH₂CH₂OH |
| 7d | Pimelic | CH₂CH₂OCH₂CH₂OH |
| 8d | Azelaic | CH₂CH₂OH |
| 9d | Nonodecane dicarboxylic | CH₂CH₂OH |
| 10d | Eicosane dicarboxylic | CH₂CH₂OH |
| 11d | Diglycolic | CH₂CH₂OH |
| 12d | Ethylene bisglycolic | (CH₃)CH₂CH₂OH |
| 13d | Methylene carboxylic acid | (CH₃)CH₂CH₂OH |
| 14d | Dilinoleic | CH₂CH₂OH |
| 15d | Stearyl malonic | CH₂CH₂OH |
| 16d | Lauryl succinic | CH₂CH₂OH |
| 17d | Isotetradecyl succinic | CH₂CH₂OH |
| 18d | Phthalic | CH₂CH₂OCH₂CH₂OH |
| 19d | Isophthalic | CH₂CH₂OH |
| 20d | Terephthalic | CH₂CH₂OH |
| 21d | Glutaconic | CH₂CH₂OH |

THE ISOCYANATE REACTANT

The isocyanate employed to react with the urethane precursor can vary widely. In general, they may be expressed as R-(CNZ)$_x$ where z is oxygen or sulfur. This includes isocyanates and isothiosyanates and mixed isocyanates and isothiocyanates. For convenience this invention will be discussed largely in terms of isocyanates. In the above formula R is an aliphatic radical, a cycloaliphatic radical, an aromatic radical and the like, and $x$ is a whole number equal to 1 or greater, for example 1 to 3.

However, we prefer to employ the diisocyanates in preparing derivatives used as anti-corrosion agents since they exhibit much greater activity than the monoisocyanates.

A preferred subgenus of this invention is that wherein the above partial structural formulae represents the polyisocyanate and more specifically the diisocyanates, which of course contain two distinct and separate isocyanate groups. Representative compounds of this subgenus are the polymethylene diisocyanates such as ethylene diisocyanate, trimethylene diisocyanate, tetramethylene diisocyanate, pentamethylene diisocyanate, etc.; the alkylene diisocyanates such as propylene-1,2-diisocyanate, butylene-1,2-diisocyanate, butylene 1,3-diisocyanate, butylene-2,3-diisocyanate; the alkylidine diisocyanates such as ethylidene diisocyanate, butylidene diisocyanate, and heptylidene diisocyanate. The cycloalkylene diisocyanates such as cyclopentylene-1,3- diisocyanate, cyclohexylene-1,2-diisocyanate, cyclohexalene-1,4-diisocyanate; the aromatic diisocyanates such as m-phenylenediisocyanates, p-phenylene diisocyanate, 1-methylphenylene-2, 4-diisocyanate, 1-methylphenylene-2, 6-diisocyanate, 3,3'-bitolylene-4,4'-diisocyanate, naphthylene-1, 4-diisocyanate, naphthylene-1,5-diisocyanate; aliphatic-aromatic diisocyanates, such as xylene-1, 4-diisocyanate, xylene-1, 3-diisocyanate, 4,4'-diphenylenemethane diisocyanate, 4,4'-diphenylenemethane diisocyanate, 4.4'-diphenylenepropane diisocyanate, etc.

The diisocyanates of the types listed in the above paragraph are the ones which are most preferred for purposes of this invention. Examples of compounds containing more than two reactive groups of formula —CNZ and of the preferred subgenus —N=C=O which can be used, there may be mentioned 1,2,4-benzene triisocyanate and butane-1,2,2-triisocyanate.

Of course, it should be remembered that the polyisothiocyanates may be used instead of the polyisocyanates and representative examples would be those given above with the single change that the oxygen atom is substituted by sulfur.

Corresponding monoisocyanate derivatives of the above diisocyanates were also reacted, but, in general, they exhibit far less activity in corrosion than the corresponding diisocyanates, for example, alkylisocyanate (e.g. methyl, ethyl, propyl, butyl, octadecyl, etc.); cycloalkyl (e.g. cyclopentylisocyanates, cyclohexylisocyanates) arylisocyanates (e.g. phenyl, naphthyl, etc.) alkaryl isocyanates (e.g. tolyl isocyanates, xylyl isocyanates), and the like.

The reactions involving isocyanates with urethane precursors are conducted in the same manner isocyanates have been reacted with other suitable reactants (see, for example, Chem. Rev. 43, 203–218 (1948), 57, 47–76 (1957).

THHE URETHANE PRODUCTS

The products of this invention are urethanes, for example,

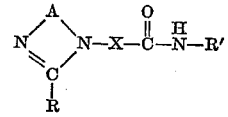

where $x$ comprises

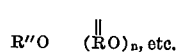

wherein the hydroxy precursor and a monoisocyanate as reacted and

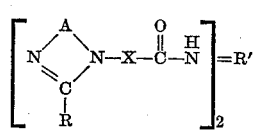

in the case of the diisocyanate.

Where the bicyclic amidines are used as hydroxy precursors, the following compounds are formed:

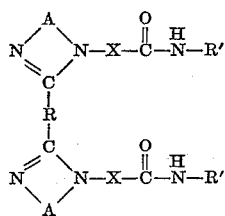

with the mono-isocyanates, and polymers are probably formed with diisocyanates, as may be expressed by the following formula

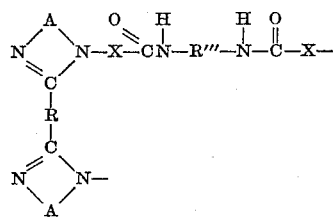

Where the isocyanate is a isothiocyanate, the product would be the analogous thiourethane, thus,

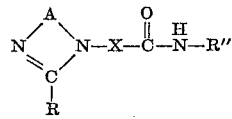

would be

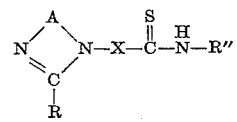

and

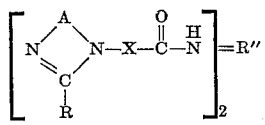

would be

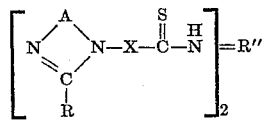

and the others correspondingly changed to where the

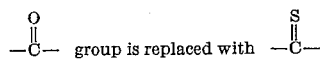 group is replaced with

In general, the urethane is prepared by adding the isocyanate (a 50% solution, by weight, in xylene) to the hydroxy-cyclic amidine over a period of ½ hour to 1 hour at 60–75° C. The addition is controlled so as to maintain this temperature. The resulting product is then diluted with xylene so that it has 50% by weight of the product. The following examples are illustrative. The products formed are generally dark viscous liquids.

*Example 10aB*

To two moles of

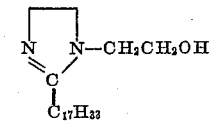

in a well-stirred reaction vessel is added one mole of a 50% solution of toluene-2,4-diisocyanate in xylene over a period of 30 minutes. The temperature during addition was 60–70° C. The product formed is

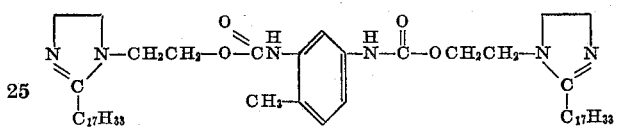

*Example 10aD*

The process of the prior example is repeated except that p,p′ diphenylmethane diisocyanate is employed. The product is

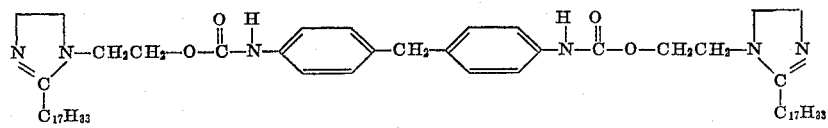

*Example 10aC*

The process of the prior example is repeated except that dianisidine diisocyanate,

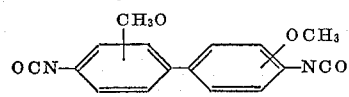

is employed. The product

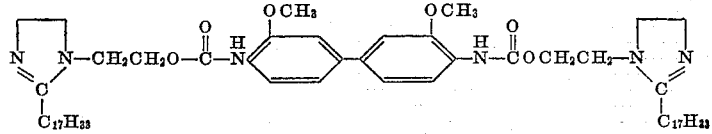

*Example 10aA*

The process of the prior example is repeated except that hexamethylene diisocyanate was employed. The product is

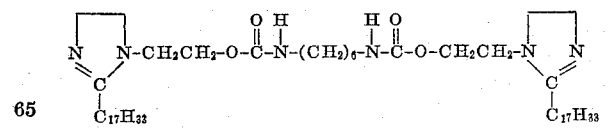

*Example 10aG*

The process of the prior example is repeated except that one mole of

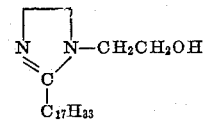

and one mole of octadecyl isocyanate is employed to yield

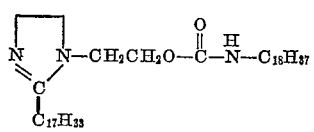

Example 10aH

The above process is repeated except that 2 moles of

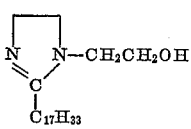

and 1 mole of 1,5 naphthalene diisocyanate are employed to yield

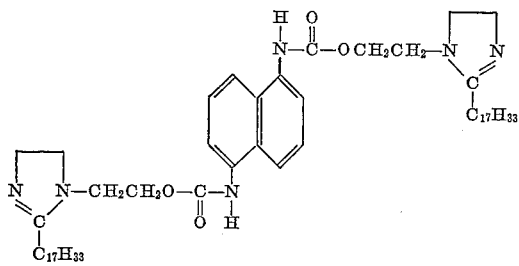

Example 10aF

The process of the prior example is repeated except that 2-naphthylisocyanate is employed. The product formed is

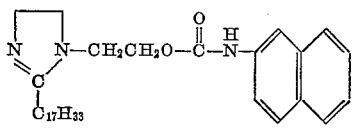

Example 9bB

The process of the prior example is repeated except that

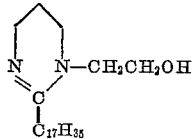

and ethyl isocyanate are employed to yield

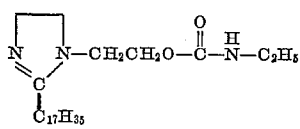

Example 9bC

The process of the prior example is repeated except that 2 moles of

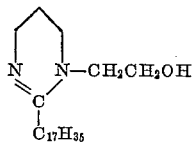

and 1 mole of m-toluene diisocyanate are employed to yield

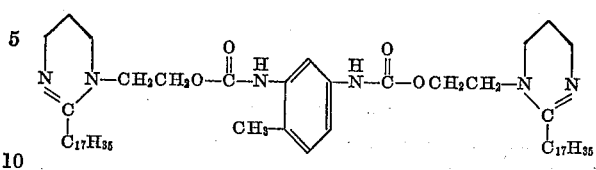

Example 9bA

The process of the prior example is repeated except that hexamethylene diisocyanate is employed to yield

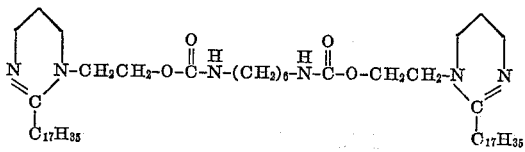

Example 3cA

The process of the prior example is repeated except that one mole of

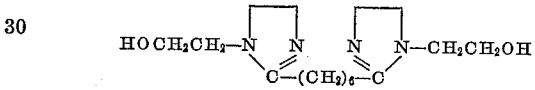

and one mole of m-toluene diisocyanate are employed to yield a polymeric material, of the probable structure:

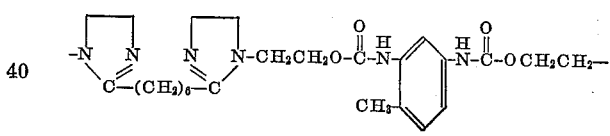

Example 3cB

The process of the prior example is repeated except that one mole of

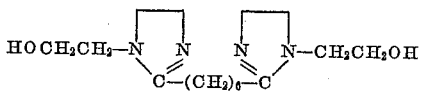

and 2 moles of octadecyl isocyanate are employed to yield

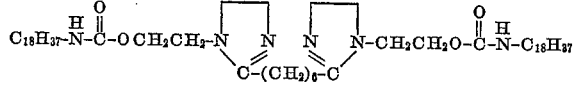

Example 28aB

The process of the prior example is repeated except that 2 moles of

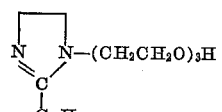

and 1 mole of p,p' diphenylmethane diisocyanate are employed to yield

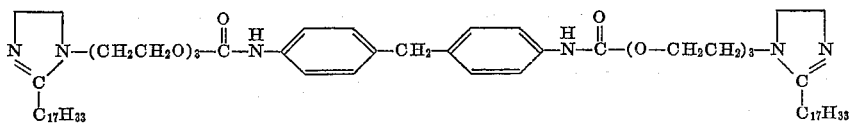

Example 20aB

The process of the prior example is repeated except that 2 moles of

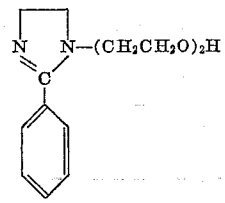

and one mole of 1,5 naphthalene diisocyanate are employed to yield

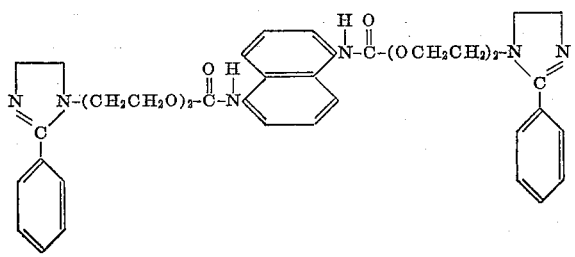

A large number of urethanes have been prepared. Since the method of preparing these compounds is quite simple, these results are presented in the following table to save repetition of preparative detail. Each urethane will have the basic number shown in the prior tables, for example, 1a, 10a, etc. indicative of the hydroxy cyclic amidine employed. In addition, it will bear capital letter A, B, C, D, etc. which indicates that it has been reacted with an isocyanate. In each example one mole of isocyanate group was employed per mol of hydroxy group on the cyclic amidine.

TABLE V

*Preparation of urethanes*

1aA   Hexamethylene diisocyanate
1aB   Mixed isomers of toluene diisocyanate
1aC   Dianisidine diisocyanate
1aD   1,5-naphthalene diisocyanate
1aE   Diphenylmethane, 4,4'-diisocyanate
10aA  Hexamethylene diisocyanate
10aB  2,4-toluene diisocyanate
10aC  Dianisidine diisocyanate
10aD  Diphenylmethane, 4,4'-diisocyanate
10aE  Ethyl isocyanate
10aF  d-naphthylisocyanate
10aG  octadecyl isocyanate
10aH  1,5 naphthalene diisocyanate
10aI  Mixed isomers of 2,4-toluene diisocyanate
14aA  Hexamethylene diisocyanate
14aB  2,4-toluene diisocyanate
20aA  1,5-naphthalene diisocyanate
28aA  Hexamethylene diisocyanate
28aB  b,b'-diphenylmethane diisocyanate
28aC  2,4-toluene diisocyanate
28aD  Dianisidine diisocyanate
9bA   Hexamethylene diisocyanate
9bB   Ethyl isocyanate
9bC   2,4-toluene diisocyanate
9bD   Dianisidine diisocyanate
9bE   Diphenylmethane, 4,4-diisocyanate
23bA  Hexamethylene diisocyanate
23bB  2,4-toluene diisocyanate
23bC  Diphenylmethane 4,4-diisocyanate
3cA   2,4-toluene diisocyanate
3cB   Octadecyl isocyanate
3cC   Dianisidine diisocyanate
3cD   Diphenylmethane 4,4-diisocyanate
4dA   2,4-toluene diisocyanate
4dB   Dianisidine diisocyanate

USE AS CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Patents Nos. 2,736,658 dated February 28, 1954, to Pfohl et al., and 2,756,211 dated July 24, 1956, to Jones, and 2,727,003 dated December 13, 1955, to Hughes.

More specifically then, and particularly from the standpoint of oil production, this aspect of the invention relates to inhibiting corrosion caused by hydrogen sulfide, carbon dioxide, inorganic acids, organic acids, combinations of each with oxygen, and with each other and oxygen. More particularly, it relates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it may be possible to effectively control corrosion by the addition of as little as 5 p.p.m. of our new compositions to the well fluids, whereas in other wells, it may be necessary to add 200 p.p.m. or more.

In using our improved compositions for protecting oil well tubing, casing and other equipment which comes in contact with the corrosive oil-brine production, we find that excellent results are obtained by injecting an appropriate quantity of selected composition into a producing well so that it mingles with the oil-brine mixture and come into contact with the casing, tubing, pumps and other producing equipment. We, for example, introduce the inhibiting composition into the top of the casing, thus causing it to flow down into the well and thence back through the tubing, etc. In general, we have found that this procedure suffices to inhibit corrosion throughout the entire system of production, and collection, even including field tankage.

In case serious emulsion or gel problems are encountered, demulsifiers are advantageously added. This is important not only to avoid the troublesome emulsions and gels themselves, but also to improve corrosion inhibition. The explanation of less effective corrosion inhibition in the presence of emulsions apparently is that the inhibitor is somewhat surface-active. That is, it is concentrated at interfacial surfaces. Since this surface is great in an emulsion, most of the inhibitor will be concentrated in these interfaces and little will remain in the body of the oil for deposition on the metal surfaces. In many wells, oil-in-water type emulsions often occur naturally. In such wells the inhibitors herein described tending to form water-in-oil type emulsions, often decrease the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out our process is relatively simple in principle. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method, however.

The present process finds particular utility in the protection of metal equipment of oil and gas wells, especially those containing or producing an acidic constituent such as $H_2S$, $CO_2$, inorganic, organic acids, $O_2$ and the like. For the protection of such wells, the reagent, either undiluted or dissolved in a suitable solvent, is fed down the annulus of the well between the casing and producing tubing where it becomes commingled with the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor composition is a liquid, it is conventionally fed into the well annulus by means of a motor driven chemical injector pump, or it may be dumped periodically (e.g., once every day or two) into the annulus by means of a so-called "boll weevil" device or similar arrangement. Where the inhibitor is a solid, it is dropped into the well as a solid lump or stick, blown in as a powder with gas, or it may be washed in with a small stream of the well fluids or other liquid. Where there is gas pressure on the casing, it is necessary, of course, to employ any of these treating methods through a pressure equalizing chamber equipped to allow introduction of reagent into the chamber, equalization of pressure between chamber and casing, and travel of reagent from chamber to well casing.

Occasionally, oil and gas wells are completed in such a manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel, after stopping the flow of fluids. After being so treated the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inhibitor is especially convenient. These are prepared by blending the inhibitor with a mineral wax, asphalt or resin in a proportion sufficient to give a moderately hard and high-melting solid which can be handled and fed into the well conveniently.

The amount of corrosion preventive agent required in our process varies with the corrosiveness of the system, but where a continuous or semi-continuous treating procedure is carried out as described above, the addition of reagent in the proportion of from 5 parts per million to 1000 parts per million or more parts of corrosive fluid will generally provide protection.

The corrosion inhibitors can be used in combination with other well-known corrosion inhibitors, for example, the cyclic amidine structures, the amido cyclic amidine structures, and the amino cyclic amidine structures, as disclosed in the Blair and Gross Reissue Patent No. 23,227. When the herein described products are mixed with corrosion inhibitors of the conventional type in the ratio of one-to-three, one-to-one, three-to-one, or the like, in numerous instances the effectiveness of the corrosion inhibitor thus obtained is often significantly greater than the use of either one alone.

Since these products are basic they can be combined with various acids to produce salts in which oil solubility is increased or decreased. Likewise, water solubility is increased or decreased. For instance, the products are mixed with one or more moles of an acid, such as higher fatty acids, dimerized fatty acids, naphthenic acids, acids obtained by the oxidation of hydrocarbons, as well as sulfonic acids such as dodecylbenzene sulfonic acid, petroleum mahogany acids, petroleum green acids, etc.

What has been said in regard to the acids which increase oil solubility and decrease water solubility applies with equal force and effect to acids of the type, such as acetic acid, hydroxyacetic acid, gluconic acid, etc., all of which obviously introduce hydrophile character when they form salts or complexes, if complexes are formed. For example, any of the acids described above is preparing the cyclic amidines are useful in preparing these salts.

As pointed out previously, the addition of corrosion inhibitors, particularly in the form of a solution by means of a metering pump or the like, is common practice. The particular corrosion inhibitors herein described are applied in the same manner as other corrosion inhibitors intended for use for the same purpose. For sake of brevity, as to the use of the corrosion inhibitor and its solution in a suitable solvent such as mineral oil, methyl ethyl ketone, xylene, kerosene, high boiling aromatic solvent, or even water.

The following examples are presented to illustrate the superiority of the instant compounds as corrosion inhibitors.

*Static weight loss tests*

These tests have been run on both synthetic and naturally occuring fluids. The test procedure involved the measurement of the corrosive action of the fluids inhibited by the compositions herein described upon sandblasted S.A.E. 1020 steel coupons measuring ⅞ x 3¼ inches under conditions approximating those found in an actual producing well, and the comparison thereof with results obtained by subjecting identical test coupons to the corrosive action of identical fluids containing no inhibitor.

Clean pint bottles were charged with 200 ml. of 10% sodium chloride solution saturated with hydrogen sulfate and 200 ml. of mineral spirits and a predetermined amount of inhibitor was then added. In all cases the inhibitor concentration was based on the total volume of fluid. Weighed coupons were then added, the bottles tightly sealed and allowed to remain at room temperature for 3 days. The coupons were then removed, cleaned by immersion in inhibited 10% hydrochloric acid, dried and weighed.

The changes in the weight of the coupons during the corrosion test were taken as a measurement of the effectiveness of the inhibitor compositions. Protection percentage was calculated for each test coupon taken from the inhibited fluids in accordance with the following formula:

$$\frac{L_1 - L_2}{L_1} \times 100 = \text{Percent protection}$$

in which $L_1$ is the loss in weight of the coupons taken from uninhibited fluids and $L_2$ is the loss in weight of coupons which were subjected to the inhibited fluids.

Static weight loss tests

TABLE VI
[At 100 p.p.m. based on total fluids]

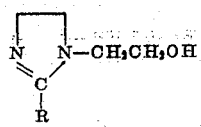

| Ex. | Inhibitor | | Mg. Loss (Ave. 3 values) | Percent Protection | Remarks |
|---|---|---|---|---|---|
| | R | Diisocyanate | | | |
| | Blank | | 171.5 | | |
| 10aD | C₁₇H₃₃ | 4,4′-diphenyl-methane | 32.6 | 80.9 | The fluids in all examples were not fully saturated with H₂S pH 6.65. The fluids were 10% sodium chloride and mineral spirits. |
| 10aA | C₁₇H₃₃ | hexamethylene | 36.4 | 78.8 | |
| 10aB | C₁₇H₃₃ | 2,4-tolune | 24.1 | 85.9 | |
| 10aC | C₁₇H₃₃ | dianisidine | 37.9 | 77.8 | |
| 10aI | C₁₇H₃₃ | Mixed isomers of 2,4-toluene | 25.7 | 84.9 | |
| 10aB | C₁₇H₃₅ | Mixed isomers of 2,4-toluene | 52.4 | 79.6 | |
| | C₁₇H₃₃ | None ¹ | 124.6 | 27.3 | |

¹ Free alcohol.

Stirring tests

These tests are run on synthetic fluids. The procedure involves the comparison of the amount of iron in solution after a predetermined interval of time of contact of a standardized iron surface with a twophase corrosive medium with similar determinations in systems containing inhibitors.

Six hundred ml. beakers equipped with stirrers and heaters are charged with 400 ml. of 10% sodium chloride containing 500 p.p.m. acetic acid and 100 ml. of mineral spirits. The liquids are brought to temperature and a 1 x 1 inch sand blasted coupon is suspended by means of a glass hook approximately midway into the liquid phase of the beaker. The stirrer is adjusted to agitate the liquids at such a rate as to provide good mixing of the two layers.

After 30 minutes samples of the aqueous phase are taken and the iron content of each sample is determined by measuring the color formed by the addition of hydrochloric acid and potassium thiocyanate in a photoelectric colorimeter.

The protection afforded by an inhibitor is measured by comparison of the amount of light absorbed by inhibited and uninhibited samples run simultaneously. Percent protection can be determined by the following formula:

$$\frac{A_1 - A_2}{A_1} \times 100 = \text{Percent protection}$$

where $A_1$ is the present light absorbed by an uninhibited sample and $A_2$ is the same value for an inhibited sample.

TABLE VII
*Stirring tests at room temperature*
[All inhibitors were used at 40 p.p.m. based on total fluid]

| Inhibitor | Percent Absorption Blank ($A_1$) | Percent Absorption Sample ($A_2$) | Percent Protection |
|---|---|---|---|
| 10aB | 28 | 1 | 96.4 |
| 10aC | 28 | 2 | 93.0 |
| 10aH | 28 | 3 | 89.3 |
| 10aI | 28 | 1 | 96.4 |
| 10aB | 28 | 2 | 93.0 |
| 10aA | 28 | 3 | 89.3 |
| 1aB | 28 | 4 | 85.6 |
| Commercial A Inhibitor | 28 | 17 | 39.2 |
| Commercial B Inhibitor | 28 | 14 | 46.5 |
| 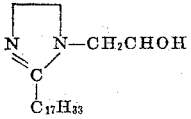 | 28 | 22 | 21.2 |

TABLE VIII
*Stirring tests at 140° F.*¹
[40 p.p.m. based on total fluids]

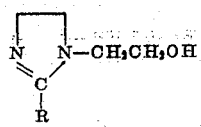

| Ex. | Inhibitor | | Percent Absorption Blank ($A_1$) | Percent Absorption Sample ($A_2$) | Percent Protection |
|---|---|---|---|---|---|
| | R | Diisocyanate | | | |
| 10aB | C₁₇H₃₃ | 2,4-toluene | 58 | 6 | 89.6 |
| 10aA | C₁₇H₃₃ | hexamethylene | 58 | 8 | 86.3 |
| 10aH | C₁₇H₃₃ | 1,5-naphthalene | 58 | 9 | 84.5 |
| 10aI | C₁₇H₃₃ | Mixed isomers 2,4-toluene | 58 | 7 | 88.0 |
| 10aD | C₁₇H₃₃ | diphenylmethane | 58 | 11 | 81.0 |
| 10aC | C₁₇H₃₃ | dianisidine | 60 | 7 | 89.5 |
| 1aB | C₁₇H₃₅ | Mixed isomer of 2,4-toluene | 60 | 7 | 89.5 |
| Commercial A Inhibitor | | | 60 | 27 | 55.0 |
| Commercial B Inhibitor | | | 60 | 21 | 65.0 |
| Commercial C Inhibitor | | | 59 | 20 | 66.2 |
| Commercial D Inhibitor | | | 59 | 19 | 67.9 |
| | C₁₇H₃₃ | None ² | 59 | 53 | 10.2 |

¹ It has been noted that some compounds have a definite actuation energy so these tests are usually run at room temperatures as well as at elevated temperatures.
² Free alcohol.

Tanker tests (cycle test)

This test was described by Malcomson et al. (Annual Meeting of the Society of Naval Architects and Marine Engineers, New York, Nov. 1952). It involves the measurement by weight loss of coupons which have been subjected to the corrosive action of sea water and a hydrocarbon for a week followed by contact for one week with sea water and air, and the comparison there to the weight loss of coupons subjected to a similar test in which a small amount of inhibitor has been added to the hydrocarbon phase.

TABLE IX
Cycle test
[All inhibitors were used at 100 p.p.m.]

| Inhibitor | Wt. loss, (Mg.) | Percent Protection |
|---|---|---|
| Blank | 210.1 | |
| 10aH | 71.3 | 65.0 |
| 10aL | 42.0 | 80.0 |
| 10aA | 55.3 | 73.7 |
| 10aB | 39.3 | 81.3 |
| 10aC | 61.6 | 70.9 |
| Commercial Inhibitor A | 141.0 | 32.5 |
| 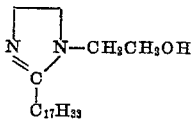 | 200.6 | 4.5 |

In using the improved compositions for the protection of oil well casing, tubing, and other equipment which comes in contact with the corrosive oil and brine, excellent results have been obtained by injecting an appropriate quantity of the selected composition into a producing well so that it mingles with the oil brine mixture and comes in contact with the casing, tubing, pumps and other producing equipment. For example, the inhibiting composition may be introduced into the top of the casing, thus causing it to flow down into the well and back through the tubing. This system suffices to inhibit corrosion in the entire system.

Using this system compound 10aB was used in four producing wells in Kansas. To evaluate the protection afforded by this chemical, small, mild steel plates which had been sand-blasted and weighed were exposed to the well fluids by insertion into the flow line near the well head for periods of two weeks. The specimens were retained on a plug by means of a plastic which afforded insulation for the plates so as to prevent interference by galvanic currents. After exposure the coupons were cleaned by a brief contact with inhibited hydrochloric acid, dried and weighed.

The results were expressed in mils penetration per year which expresses the depth of surface, in thousandths of an inch, removed in a year assuming the corrosion had occurred uniformly over the entire surface. This value was readily calculated by the simple formula $$MPY = \frac{\text{Weight of Metal Removed}}{\text{Density of Metal} \times \text{Area} \times \text{Years}} \times 1000$$

In pumping wells it has been found that when penetrations are lowered to a value of 1 MPY or less, generally acceptable protection can be expected. Tolerable rates may range up to 4 MPY. Obviously the lower values are more acceptable.

Experience has shown good correlation between penetration rates as shown by coupons and the well corrosion history.

The effectiveness of the described compositions in inhibiting corrosion occurring in oil wells can be better and more fully understood by reference to the results obtained in the aforementioned well tests. In these tests a six week control period was first set aside during which time three sets of coupons were used in each well with the exposure time of each set being approximately two weeks, after which interval the MPY values were determined as previously described. During this control period a well-known commercial corrosion inhibitor previously determined to be the best for the well was used in the wells at a rate of approximately two gallons per week per well with treatment being semi-weekly at approximately one gallon per treatment per well. At the end of this control period the new composition 10aB was injected using the same treating procedure and rate as during the previous control period. The results of these tests are described in the following table:

| Well Name and Number | Control Period | | | | With 10aB | | | |
|---|---|---|---|---|---|---|---|---|
| | [1] M/8-M/22 | M/22-M/15 | M/5-M/19 | Ave. | M/3-M/16 | M/16-M/30 | M/1-M/15 | Ave. |
| Koogler #86 | 9.30 | 10.07 | 14.33 | 10.90 | 10.07 | 0.44 | 1.72 | 4.08 |
| Koogler #92 | 6.84 | 1.52 | 5.90 | 4.79 | 1.15 | 1.03 | 1.33 | 1.17 |
| Hull-Higgins #16 | 3.69 | 1.05 | 1.21 | 1.98 | 0.87 | 0.48 | 1.57 | 0.97 |
| Bender D #4 | 8.42 | 6.65 | 4.25 | 6.44 | 2.71 | 5.53 | 3.05 | 3.76 |

[1] M indicates a month without specific designation.

The unexpected superiority of the instant compounds over the untreated hydroxyaliphatic amidines and other of the best commercially available inhibitors has clearly been demonstrated.

OTHER USES

These products are effective not only as corrosion inhibitors but can be used for a number of other purposes. For instance, they can be used as asphalt additives to increase the adhesiveness of the asphalt to the mineral aggregates. In the form of water soluble salts, they are useful as bactericides in the secondary recovery of oil. The hydroxyaliphatic amidines may be subjected to extensive oxyalkylation by means of ethylene oxide, propylene oxide, butylene oxide, or the like prior to reaction with the isocyanate. These are oxyalkylated and still have oil solubility as, for example, by the addition of propylene oxide or butylene oxide, or are oxyalkylated to produce water solubility as, for example, by means of ethylene oxide or glycide. They are also oxyalkylated by combinations of propylene oxide and ethylene oxide so that both water solubility and oil solubility remain. Thereupon they are reacted with isocyanates. Such products are useful for a variety of purposes and particularly for those where nonionic surfactants or sequestered cationic surfactants are indicated.

In addition, the compounds of this invention have the following application:

Agriculture: Additive for kerosene, phenothiazine, pyrethrum sprays, fungicides, herbicidal oils.

Anti-static treatment: for hotel rugs, hospital floors, automobile upholstery, plastic and wax polishes, wool oils, lubricants for synthetic fibers.

Building materials: water repellent treatment for plaster, concrete, cement, roofing materials, air entrainment, floor sealers, linoleum.

Cosmetics: formulation of anti-perspirants, deodorants, sun screens, hair preparations.

De-emulsifying: in antibiotic extraction, breaking crude oil and water-gas for emulsions.

Detergents; metal cleaning emulsions, lens cleaners, floor oils, dry cleaning detergents, radiator flushes, cesspool acid, boiler scale solvents, germicidal corrosion-inhibited acid detergents for dairies, enamel equipment, toilet bowls.

Leather: flat liquoring oils, pickling, acid degreasing, dye fixative.

Metals: rust preventive oils, cutting oils, water displacing compounds, pickling inhibitor, solvent degreasing.

Paints: for improved adhesion of primers, preventing water spotting in lacquers, anti-skinning, pigment flushing, grinding and dispersing, anti-feathering in inks.

Petroleum: germicide in flood water treatment, de-emulsifying fuel oil additives, anti-strip agent in asphalt emulsions and cutbacks.

Textiles: in rubberizing, textile oils, dyeing assistants, softening agents.

Miscellaneous: bentonite-amine complexes, metal-amine complexes, preparation of pentachlorphenates, quaternaries, plastisols, and rodent repellents.

Having thus described our invention, what we claim as new and desire to obtain by Letters Patent, is

1. A compound of the formula

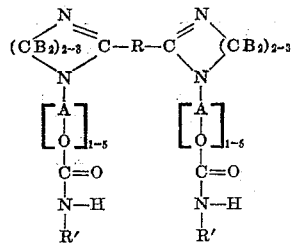

where B is selected from the group consisting of hydrogen and lower alkyl, A is lower alkylene having at least two carbon atoms, R is hydrocarbon having 1–36 carbon atoms, and R' is hydrocarbon moiety of hydrocarbon isocyanate having 1–30 carbon atoms, R' being in both instances always the same.

2. A compound of the formula

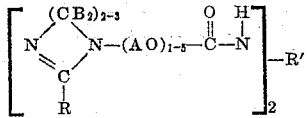

where B is selected from the group consisting of hydrogen and lower alkyl, A is lower alkylene having at least two carbon atoms, R is hydrocarbon having 1–36 carbon atoms, and R' is hydrocarbon moiety of hydrocarbon isocyanate having 1–30 carbon atoms.

3. A compound of the formula

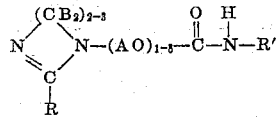

where B is selected from the group consisting of hydrogen and lower alkyl, A is lower alkylene having at least two carbon atoms, R is hydrocarbon having 1–36 carbon atoms, and R' is hydrocarbon moiety of hydrocarbon isocyanate having 1–30 carbon atoms.

4. A compound of the formula

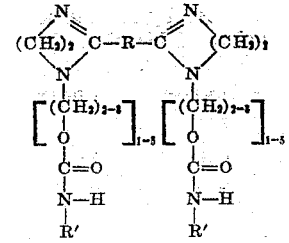

where R is hydrocarbon having 1–36 carbon atoms and R' is hydrocarbon moiety of hydrocarbon isocyanate having 1–30 carbon atoms, R' being in both instances always the same.

5. A compound of the formula

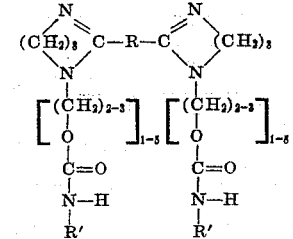

where R is hydrocarbon having 1–36 carbon atoms and R' is hydrocarbon moiety of hydrocarbon isocyanate having 1–30 carbon atoms, R' being in both instances always the same.

6. A compound of the formula

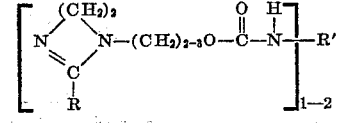

where R is hydrocarbon having 1–36 carbon atoms and R' is hydrocarbon moiety of hydrocarbon isocyanate having 1–30 carbon atoms.

7. A compound of the formula

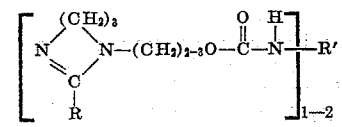

where R is hydrocarbon having 1–36 carbon atoms and R' is hydrocarbon moiety of hydrocarbon isocyanate having 1–30 carbon atoms.

8. A compound of the formula

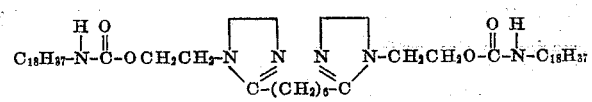

9. A urethane formed by reacting one mole of

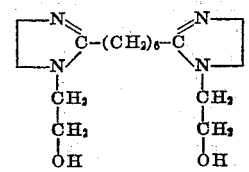

with one mole of m-toluene diisocyanate.

10. A compound of the formula

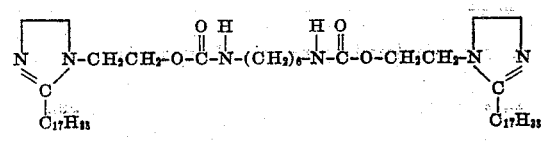

11. A compound of the formula
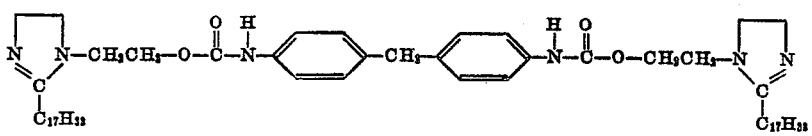
12. A compound of the formula
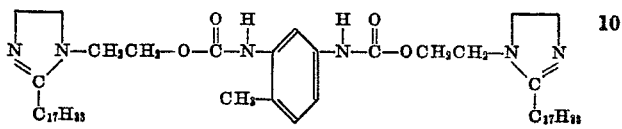
13. A compound of the formula
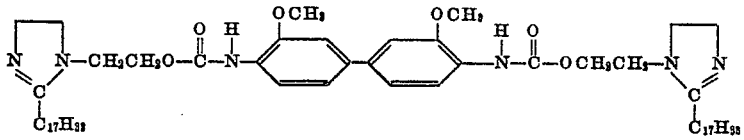
14. A compound of the formula
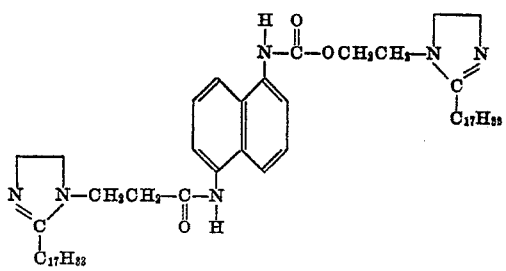
15. A compound of the formula
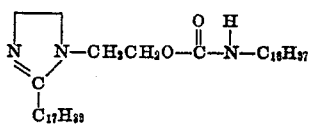
16. A compound of the formula
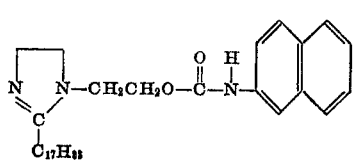
17. A compound of the formula
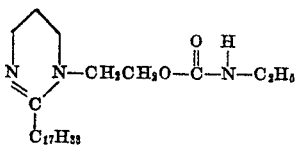
References Cited in the file of this patent
UNITED STATES PATENTS
| | | |
|---|---|---|
| 2,468,163 | Blair et al. | Apr. 26, 1949 |
| 2,516,626 | Haury | July 25, 1950 |
| 2,640,029 | Blair et al. | May 26, 1953 |
| 2,662,080 | Smith | Dec. 8, 1953 |
| 2,794,810 | Cusic | June 4, 1957 |
OTHER REFERENCES
Chem. Abstracts, Index to vol. 51, p. 1245S, December 1951.